(12) United States Patent
Wang

(10) Patent No.: US 8,727,377 B2
(45) Date of Patent: May 20, 2014

(54) ADAPTIVE VENT AND METHOD FOR AIRBAG

(75) Inventor: Jenne-Tai Wang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/403,874

(22) Filed: Feb. 23, 2012

(65) Prior Publication Data

US 2013/0221643 A1    Aug. 29, 2013

(51) Int. Cl.
  *B60R 21/217* (2011.01)
  *B60R 21/2338* (2011.01)
  *B60R 21/276* (2006.01)

(52) U.S. Cl.
  USPC .......................... 280/739; 280/742; 280/743.2

(58) Field of Classification Search
  USPC ................. 280/739, 732, 734–736, 741, 742, 280/743.2
  See application file for complete search history.

(56) References Cited

U.S. PATENT DOCUMENTS

| | | | | |
|---|---|---|---|---|
| 5,388,860 | A * | 2/1995 | Brede et al. | 280/739 |
| 6,241,279 | B1 * | 6/2001 | Ochiai | 280/735 |
| 6,547,274 | B2 * | 4/2003 | Ochiai | 280/735 |
| 6,692,021 | B2 * | 2/2004 | Amamori | 280/739 |
| 7,021,656 | B2 * | 4/2006 | Okamoto et al. | 280/739 |
| 7,036,843 | B2 * | 5/2006 | Okamoto et al. | 280/728.3 |
| 7,275,761 | B2 * | 10/2007 | Gould et al. | 280/742 |
| 7,758,072 | B2 * | 7/2010 | Kim | 280/739 |

* cited by examiner

*Primary Examiner* — Paul N Dickson
*Assistant Examiner* — Laura Freedman

(57) ABSTRACT

An airbag assembly includes an housing, an inflator mounted in the housing, and an airbag. A vent opening is provided in the wall of the housing for venting inflation gas from the housing. A vent cover closes the vent opening so that inflation gas does not reach the vent opening. A valve member also closes the vent cover and is selectively moveable by an electric actuator to adapt the valve member to a selected degree of closure in response to sensed conditions of the occupant and the vehicle. A tether is connected to the airbag and to the vent cover to suddenly open the vent cover as the airbag reaches a certain stage in its deployment, so that the rate at which inflation gas is vented from the housing through the vent opening will be determined by the previously established selected degree of closure of the vent opening.

16 Claims, 6 Drawing Sheets

US 8,727,377 B2

ADAPTIVE VENT AND METHOD FOR AIRBAG

FIELD OF THE INVENTION

The present invention relates to an automotive airbag for restraint of an occupant and more particularly provides an adaptive vent for adapting the airbag to the particularly sensed protection needs of an individual occupant.

BACKGROUND OF THE INVENTION

It is well known in motor vehicles to inflate an inflatable airbag forwardly of a seated occupant in order to restrain the forward movement of the occupant, in conjunction with a seatbelt.

The prior art has recognized that the restraint of the occupant by the airbag can be affected by such factors as the size of the occupant, the weight of the occupant, position of the vehicle seat and speed of the vehicle.

It would be desirable to provide an improved airbag system which could, upon a particular occupant entering a vehicle, sense key characteristics about that occupant and then adapt the airbag system to provide optimal restraint of that individual occupant.

SUMMARY OF THE INVENTION

An airbag assembly includes a housing having a wall, and an inflator mounted in the housing for generating inflation gas. An airbag is folded atop the inflator to be inflated by the inflation gas. A vent opening is provided in the wall of the housing for venting inflation gas from the housing. A vent cover has a normally closed position, closing the vent opening so that the inflation gas will be directed into the airbag to speed its inflation toward the occupant. A tether is connected to the airbag and to the vent cover to open the vent cover as the airbag reaches a certain stage in its deployment toward the occupant. A valve member also closes the vent cover and is selectively moveable to provide a selected degree of closure and opening of the vent opening. The valve member is operated by an electric actuator which, upon entry of an occupant into the vehicle, and during the driving of the vehicle, will operate the valve member to a position which adapts the size of the vent opening to the particular occupant. Thus, when the tether opens the vent cover, the rate at which inflation gas is vented from the housing through the vent opening will be determined by that previously established selected degree of closure of the vent opening. A controller is provided to and gathers data from sensors to that sense the size, weight and/or position of the seated occupant, vehicle speed, and other data that is useful to determine the optimal inflation of the air bag for the particular seated occupant.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
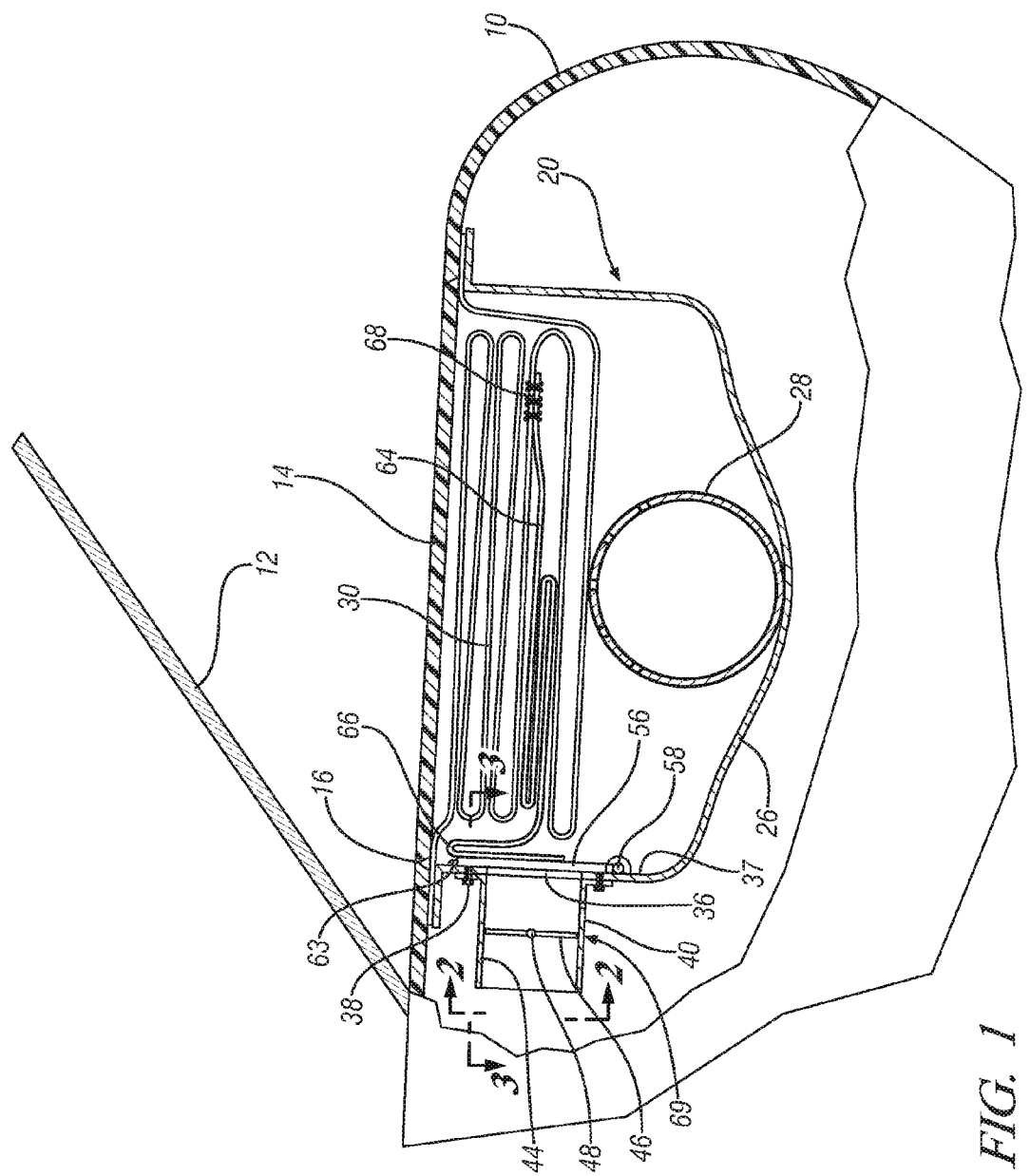
FIG. 1 is a side elevation view of a vehicle instrument panel having an airbag according to the present invention, and having parts broken away and in section.

Referring to FIG. 1, it is seen that a motor vehicle body includes an instrument panel 10 that is located forwardly of a vehicle seat, not shown. A windshield 12 defines the forward limit of the instrument panel 10. The instrument panel has an airbag door 14 which closes an airbag opening 16 provided in the instrument panel 10.

An airbag assembly, generally indicated at 20, is hidden beneath the airbag door 14 of the instrument panel 10. The airbag assembly 20 includes a housing 26 which is commonly constructed of stamped steel or extruded aluminum and in which an inflator assembly 28 is mounted. An airbag 30 is made of a flexible fabric material and is folded to be housed within the housing 26 and atop the inflator 28. A vent opening 36 is provided in a wall 37 of the housing 26.

Figure 2:
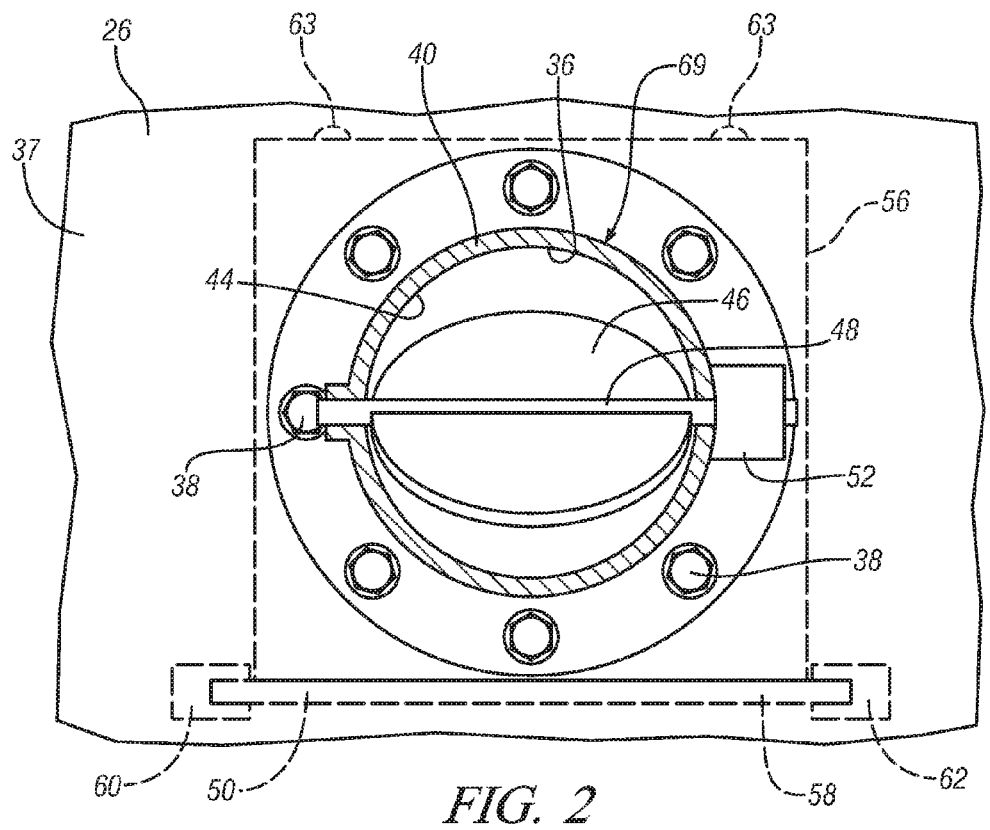
FIG. 2 is a view taken in the direction of arrows 2-2 of FIG. 1.
Figure 3:
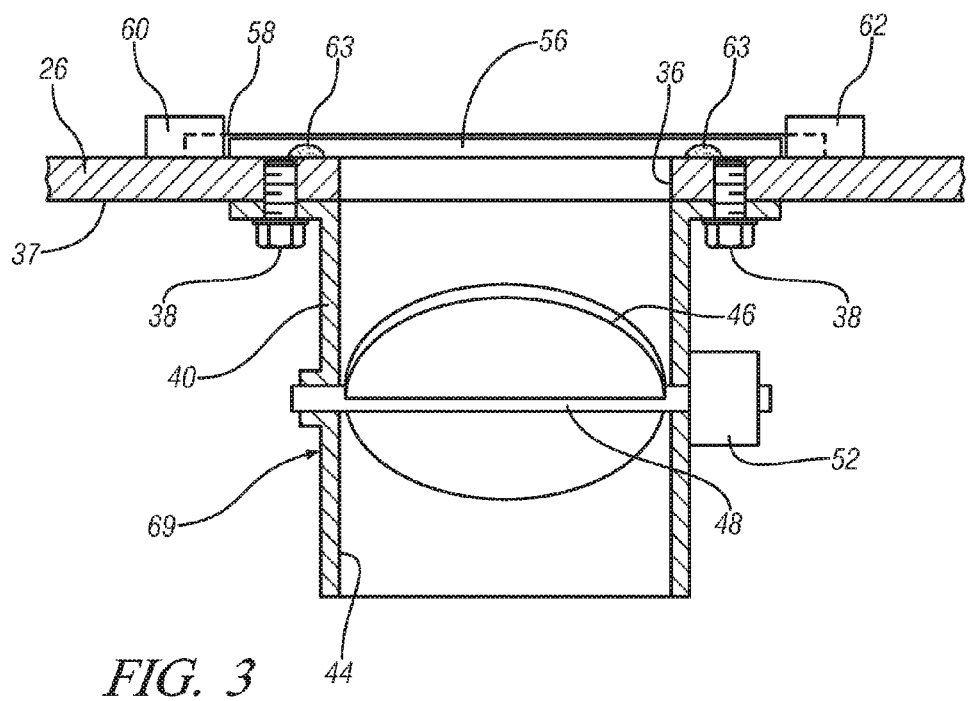
FIG. 3 is a view taken in the direction of arrows 3-3 of FIG. 1.

As best seen in FIGS. 1, 2 and 3, the vent opening 36 is round and has a tubular sleeve 40 attached to the outside wall of the housing 26 by screws 38. The tubular sleeve 40 has a circular throat 44 in which an adjustable valve member, particularly a rotating circular disc 46, is rotatably mounted on a pivot shaft 48. The ends of the pivot shaft 48 extend through holes in the tubular sleeve 40 and a rotary actuator 52 is attached to one end of the shaft 48. Energizing the rotary actuator 52 will rotate the disc 46 to any degree of rotation so that the disc 46 can either completely obstruct the throat 44 as shown in FIG. 1 or, the disc 46 can be rotated to be at any selected degree of rotation with respect to the vent opening 36 so that the vent opening 36 can be throttled to control and modulate the communication of inflation gas through the vent opening 36 and the tubular sleeve 40.

FIGS. 1, 2 and 3 also show that a vent cover 56 is mounted on the inside of the wall 37 of the housing 26 by a hinge pin 58 that has ends mounted in hinge brackets 60 and 62 connected to the housing wall 37. The vent cover 56 closes the vent opening 36. As best seen in FIG. 3, the edges of the vent cover 56 are adhesively secured to the wall 37 of housing 26 by adhesive beads 63 so that the vent cover 56 is secured to the housing 26 and thereby retained at its closed position shown in FIG. 1. FIG. 1 also shows a tether 64, in the form of a strap of airbag material, having one end 66 attached to the end of the vent cover 56 opposite the hinge 58, and its other end 68 sewn to the airbag 30.

Figure 4:
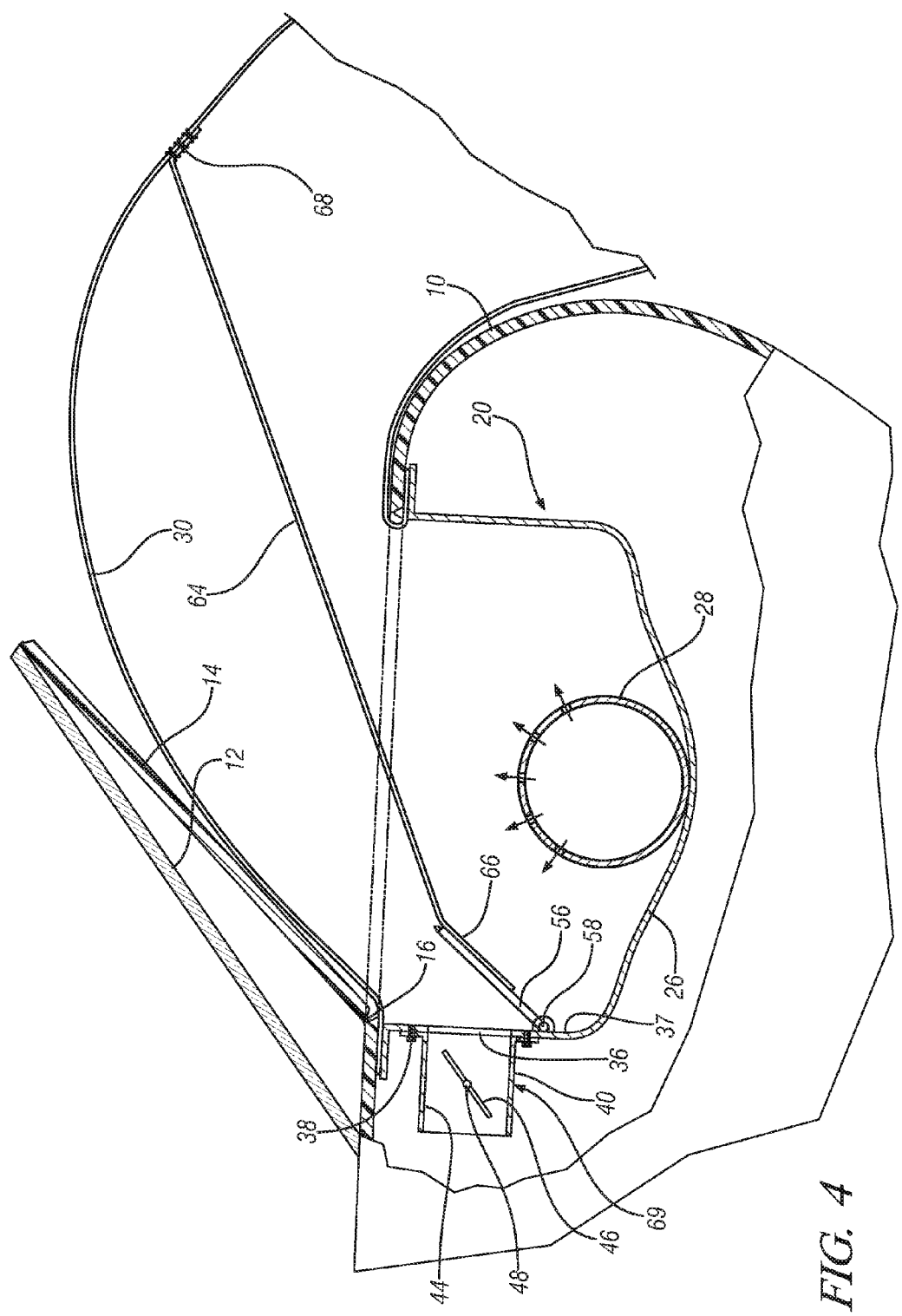
FIG. 4 is a side elevation view similar to FIG. 1 but showing the airbag being inflated to restrain an occupant.

Referring to FIG. 4, it is seen that the inflator 28 has been actuated to create inflation gas which in turn has forced the folded up airbag 30 to be unfolded and expelled through the opening 16 in the instrument panel 10 as permitted by upward pivoting movement of the door 14 into engagement with the windshield 12. FIG. 4 also shows that the air bag 30 has been inflated to such an extent that the tether 64 has been tensioned and the force applied to the tether 64 by the inflating airbag has forcibly pivoted the vent cover 56 away from its closed position of FIG. 1 to an open position of FIG. 4. Pivoting of the vent cover 56 to the open position of FIG. 4 was enabled by the tether 64 applying sufficient force to overcome the adhesive sealant that had retained the vent cover 56 at its fully closed position. Accordingly, as seen in FIG. 4, once the vent cover 56 is suddenly moved to an open condition relative to the vent opening 36, the inflation gas is allowed to escape through the vent opening 36. The rate at which the inflation gas is permitted to be vented through the vent opening 36 will be determined by the degree of closure of the circular disc 46. Thus it is seen that the circular disc 46 operates as an adapter valve member, generally designated 69, that will determine the rate of flow of the inflation gas through the vent opening 36. However, the inflation gas cannot reach the adapter valve member 69 until the vent cover 56 is suddenly opened by the tether 64.

Figure 5:
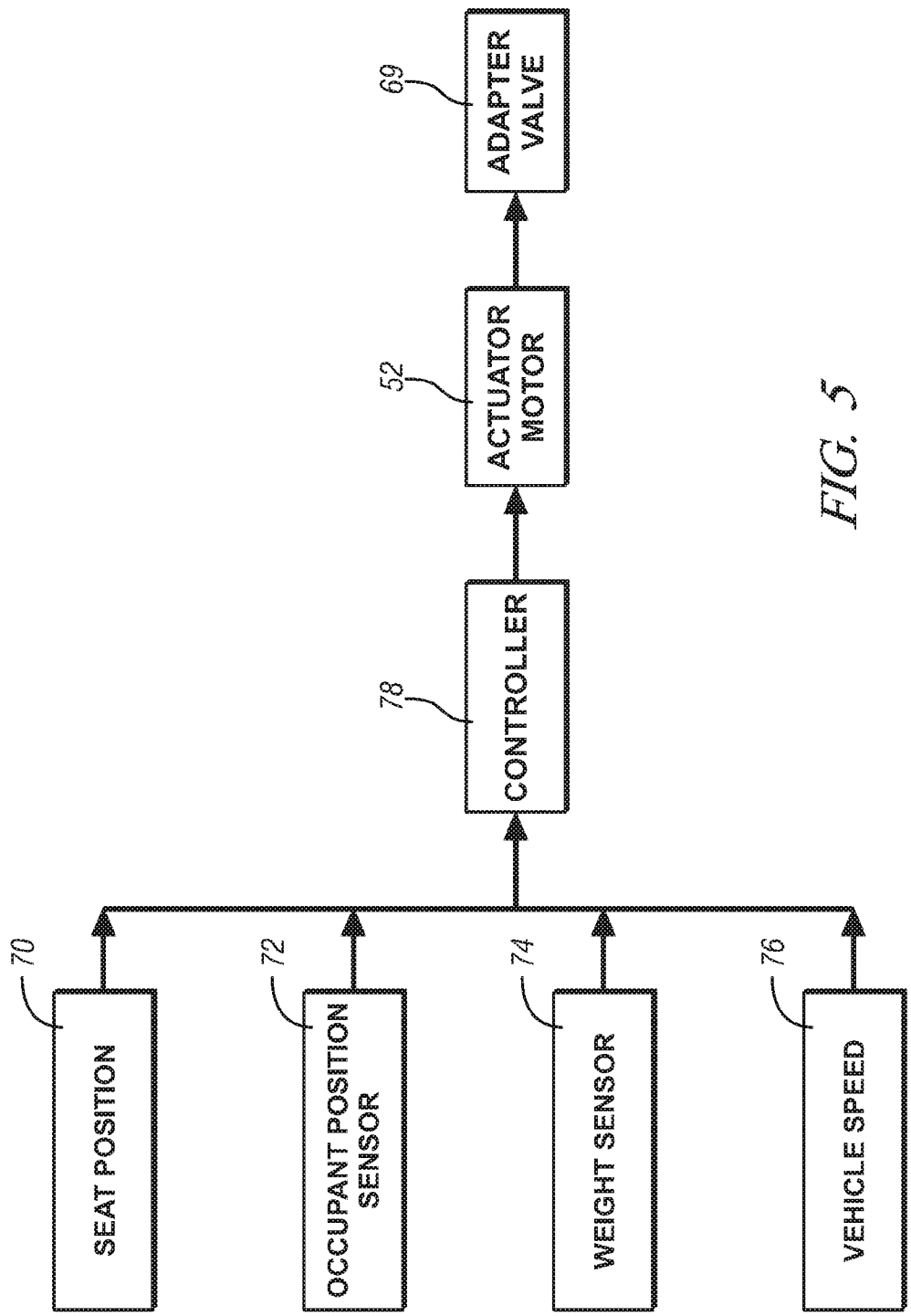
FIG. 5 is a schematic of sensors and a control system for operating the adapter valve of FIGS. 2 and 3.

Referring to FIG. 5, there is shown a typical schematic of a sensing and control system for determining the degree of closure of the valve member provided by the circular disc 46. In particular, FIG. 5 shows a seat position sensor 70, an occupant position sensor 72, an occupant weight sensor 74, and a vehicle speed sensor 76. These sensors provide inputs to a controller 78 that processes the sensed data through an algorithm which then sends a control signal to the motor actuator 52 which in turn will rotate the valve disc 46 to its calculated position. Thus, it will be understood that upon startup and driving of the vehicle, the sensors can continuously gather information that is relative to adapting the airbag system to the needs of the particular occupant, and then modulate the position of the valve disc 46 accordingly as conditions change during the vehicle trip. It will be understood that there is no attempt to adjust the position of the valve disc 46 at the particular instant of an airbag inflating event. Rather, the valve disc 46 will already be prepositioned in advance of the inflation event. Then, upon occurrence of the inflation event, when the vent cover 56 is moved to the open position as shown in FIG. 4, the valve disc 46 will have already been established at the appropriate degree of closure for adapting the airbag inflation event to the needs of the particular seated occupant for which the occupant particular data has been collected by the various sensors and calculated by the controller.

Thus in summary, it is seen that the vent cover 56 provided on the inside of the housing acts as a normally closed valve that blocks the inflation gas from reaching the vent opening until the tether 64 rapidly opens the vent cover 56 upon the air bag reaching a certain deployment condition. The adapter valve member 69 mounted on the outside of the housing has been preset by the controller 78 in readiness for the inflation event, but does not move during the inflation event. Thus the vent cover 56 and the adapter valve member 69 function as serially arranged valves, through which the inflation gas is vented.

Figure 6:
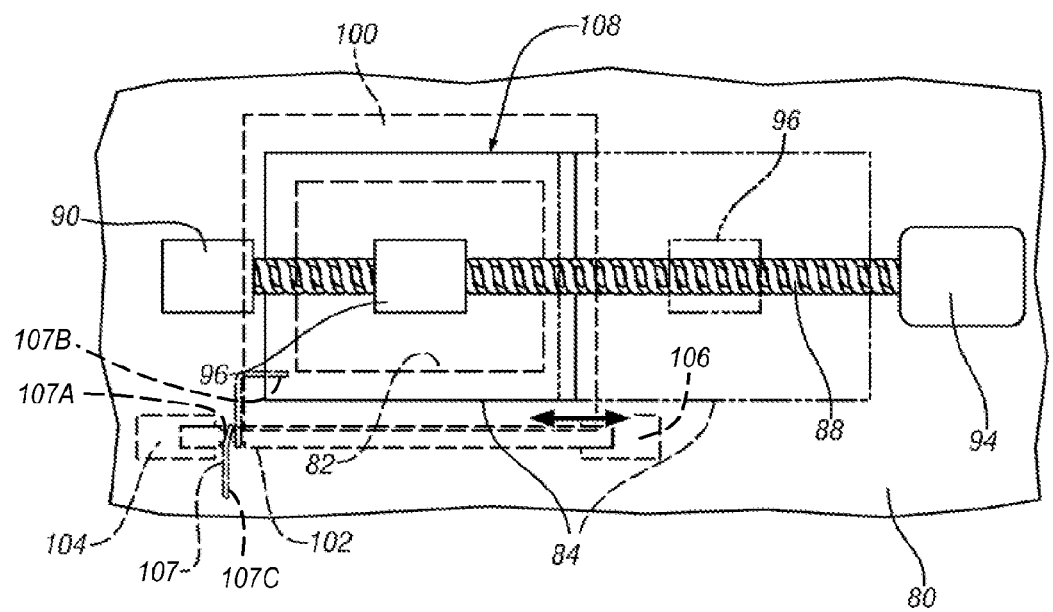
FIG. 6 is an elevation view of another embodiment of an adapter valve.
Figure 7:
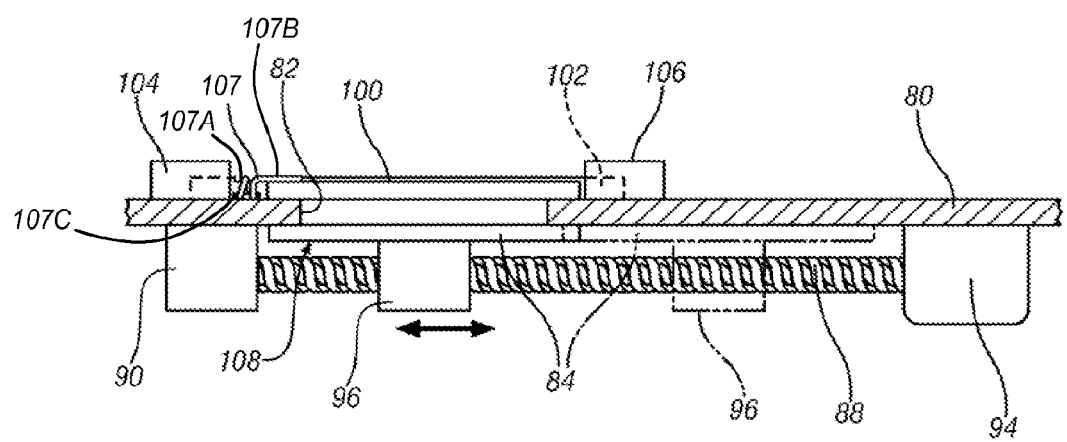
FIG. 7 is a top view of the adapter valve of FIG. 6.

Referring to FIGS. 6 and 7, another example is shown of the valve member for opening and closing the vent opening in the wall of the housing. In particular, as seen in FIGS. 6 and 7, an airbag housing 80 has a rectangular vent opening 82 therein, which is closed by a sliding gate valve 84. A rotary drive shaft 88 has one end rotatably mounted on a bearing 90 and its other end driven by a rotary actuator 94. A drive nut 96 is attached to the sliding gate valve 84 and meshes with the drive shaft 88 so that rotation of the drive shaft 88 by the actuator 94 will translate the sliding gate valve 84 left and right relative to the vent opening 82. The actuator 94 of FIGS. 6 and 7 will receive a control signal from the controller 78 of FIG. 5 in order to slide the sliding gate valve 84 right and left in FIG. 6, thus providing an adapter valve member, generally indicated at 108, and an appropriate degree of closure of the vent opening 82 in readiness for an inflation of the airbag. A vent cover 100 is provided inside the housing 80, and mounted by a hinge pin 102 pivoted on hinge brackets 104 and 106. A spring 107 has a central coil 107A, a first leg 107B that engages the vent cover 100, and a second leg 107C that engages the housing 80. Spring 107 acts on the vent cover 100 to position the vent cover 100 as shown in FIGS. 6 and 7, to close off the vent opening 82. Upon inflation of the air bag, the tether 64 shown in FIG. 4 will pivot the vent cover 100 against the bias of the spring 107 to an open position in which the inflation gas will be vented through the vent opening 82 at the rate determined by the degree of closure provided by the sliding gate valve 84.

Figure 8:
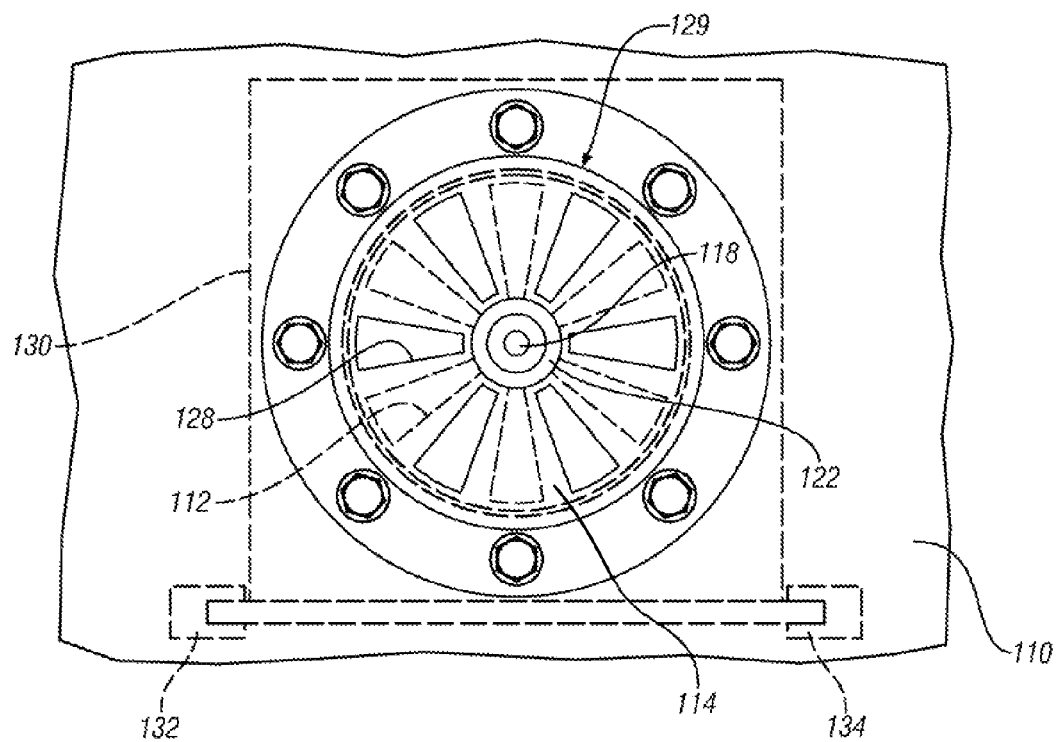
FIG. 8 is an elevation view of yet another example of the adapter valve.
Figure 9:
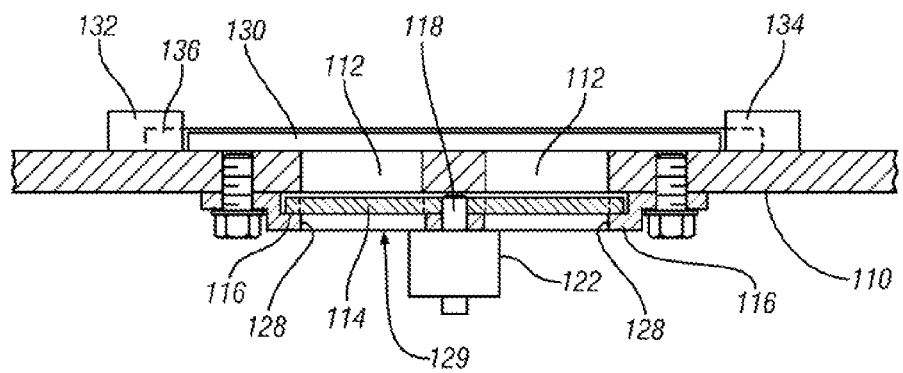
FIG. 9 is a plan view of the adapter valve of FIG. 8.

FIGS. 8 and 9 show yet another embodiment of the adaptive valve arrangement in which an airbag housing 110 has a vent opening that is defined by a plurality of radially spaced apart tear-shaped slots 112. A rotary valve member 114 is rotatably mounted on the outside of the housing 110 by a retaining ring 116 and rotary shaft 118. An actuator 122 is attached to the rotary shaft 118 and will rotate the rotary valve member 114 through a few degrees of rotation so a plurality of radially spaced tear-shaped slots openings 128 provided in the rotary valve member 114 will either completely seal off the slots 112 or partly or completely open the slots 112 as determined by the rotary position established by the actuator 122, thus providing an adapter valve, generally indicated at 129. A vent cover 130 is provided on the inside of the vent housing 110 and hinged to the inside of the housing 110 by hinge brackets 132 and 134 and a hinge pin 136. The vent cover 130 completely covers the vent openings 112 until there is an airbag inflation event during which a tether, as in FIG. 1, will remove the vent cover 130 so that inflation gas can be vented through the valve member 114 at a rate determined by its rotary position.

Thus it is seen that the vent cover is provided on the inside of the housing which acts as a normally closed valve that blocks the inflation gas from reaching the vent opening until a tether connected to the air bag opens the vent cover. Then, the rate at which inflation gas is vented from the air bag inflator is determined by an adaptive valve member that has been set at a selected degree of closure by the sensors and the controller. It will be appreciated that the electric actuator for operating the adapter valve member need not be a fast acting actuator as there is no attempt to adjust the adapter valve member at the instant of air bag inflation.

Although the foregoing description of the invention provides certain examples of a valve member and a vent cover, it will be understood that the implementation of the invention can be achieved using other valve and cover structures. In addition, although the examples shown herein have the vent cover mounted on the housing wall by a hinge and held in the closed position by adhesive or a spring, other equivalent structures will be apparent to person of skill in the art. For example, the cover may be as simple as a patch of material that is attached to the housing wall by adhesive and then torn away by the tether when the air bag inflates. Or the cover can be hinged, but held in the closed position by a spring or other mechanical device that will be overcome by the tether to allow the cover to be removed from covering the vent opening.

What is claimed is:

1. A method of venting an inflatable air bag, comprising:
providing a vent opening in a housing wall of an air bag housing of an air bag assembly;
providing a vent cover over the vent opening to cover the vent opening so that inflation gas cannot reach the vent opening;
providing an adapter valve in air flow communication with the vent opening;
modulating the adapter valve in response to continuously sensed conditions of occupant and a vehicle during a vehicle trip so that the vent opening is continuously adjusted during the trip and prior to inflating the air bag to a degree of closure that will provide a calculated rate of venting of inflation gas from the air bag housing;
and opening the vent cover upon the air bag reaching a certain degree of inflation so that inflation gas is then communicated to the vent opening and the inflation gas is vented from the air bag housing through the adapter valve at the calculated rate that was determined during the vehicle trip prior to the inflating of the air bag.

2. The method of claim 1 further comprising said adapter valve being moved by an electric actuator, and said electric actuator being controlled in response to sensors.

3. The method of claim 2 further comprising said sensors sensing one or more conditions selected from a group including seat position, occupant position, vehicle speed, and occupant weight.

4. The method of claim 2 further comprising a controller receiving inputs from the sensors and controlling the electric actuator.

5. The method of claim 1 further comprising the vent cover being closed against the vent opening on an inside of the housing wall and the adapter valve being located on an outside of the housing wall.

6. The method of claim 1 further comprising said adapter valve including a tubular sleeve in which a rotary disc valve is mounted and rotated by an electric actuator.

7. The method of claim 1 further comprising said adapter valve being a sliding gate valve that is slid across the vent opening by an electric actuator.

8. The method of claim 1 further comprising said adapter valve being slots provided in the housing wall and a disc having slots that register with the slots of the housing wall, and an electric actuator rotates the disc.

9. The method of claim 1 further comprising opening the vent cover by a tether connecting the vent cover to the air bag so that upon the air bag reaching a certain degree of inflating movement the vent cover will be opened.

10. The method of claim 9 further comprising the vent cover being attached to the housing wall by an adhesive bond and the tether being attached to the vent cover and the adhesive bond being broken by the tether to move the vent cover to an open position.

11. A method of venting an inflatable air bag, comprising:
providing a vent opening in a housing wall of an air bag housing of an air bag assembly;
providing a vent cover on an inside of the housing wall to cover the vent opening so that inflation gas cannot reach the vent opening;
providing an adapter valve communicating with the vent opening;
continuously sensing the conditions of one or both of an occupant and a vehicle during a vehicle trip and calculating a need for venting of inflation gas from the air bag housing;
modulating the adapter valve in response to the calculated need for venting so that during the vehicle trip and prior to the inflation of the air bag the vent opening is adjusted to a degree of closure that will provide a calculated rate of venting of inflation gas from the air bag housing;
and providing a tether connecting between the vent cover and the air bag to suddenly open the vent cover upon the air bag reaching a certain degree of inflation so that inflation gas is then communicated to the vent opening and the inflation gas is vented from air bag housing at the calculated rate that was determined during the vehicle trip prior to the inflating of the air bag.

12. The method of claim 11 further comprising the adapter valve being moved by an electric actuator, and said electric actuator being controlled in response to the conditions sensed by one or more sensors.

13. The method of claim 12 further comprising said sensors sensing one or more conditions selected from a group including one or more of seat position, occupant position, vehicle speed, and occupant weight.

14. The method of claim 12 further comprising a controller receiving inputs from the sensors and controlling the electric actuator.

15. The method of claim 11 further comprising the vent cover being closed against the vent opening on an inside of the housing wall and the adapter valve being located on an outside of the housing wall.

16. The method claim 11 further comprising adhering the vent cover to the housing wall by an adhesive bond and the tether being attached to the vent cover and breaking the adhesive bond to move the vent cover to an open position.

* * * * *